United States Patent
Ardo et al.

(10) Patent No.: US 10,580,121 B2
(45) Date of Patent: Mar. 3, 2020

(54) IMAGE NOISE REDUCTION BASED ON A MODULATION TRANSFER FUNCTION OF A CAMERA DOME

(71) Applicant: Axis AB, Lund (SE)

(72) Inventors: Bjorn Ardo, Lund (SE); Johan Nystrom, Vellinge (SE)

(73) Assignee: Axis AB, Lund (SE)

( * ) Notice: Subject to any disclaimer, the term of this patent is extended or adjusted under 35 U.S.C. 154(b) by 159 days.

(21) Appl. No.: 15/815,168

(22) Filed: Nov. 16, 2017

(65) Prior Publication Data

US 2019/0147574 A1 May 16, 2019

(51) Int. Cl.
*G06T 5/00* (2006.01)
*H04N 5/217* (2011.01)
*G06T 5/20* (2006.01)
*G06T 7/80* (2017.01)
*H04N 5/232* (2006.01)

(52) U.S. Cl.
CPC .......... *G06T 5/20* (2013.01); *G06T 5/002* (2013.01); *G06T 7/80* (2017.01); *H04N 5/217* (2013.01); *H04N 5/23229* (2013.01); *H04N 5/23238* (2013.01); *G06T 2207/10016* (2013.01)

(58) Field of Classification Search
CPC .. G06T 5/002; G06T 5/20; G06T 7/80; G06T 2207/10016; H04N 5/217; H04N 5/23229; H04N 5/23238
See application file for complete search history.

(56) References Cited

U.S. PATENT DOCUMENTS

| | | | | |
|---|---|---|---|---|
| 5,638,167 A | * | 6/1997 | Nakamura | G02F 1/1309 356/121 |
| 6,982,755 B1 | | 1/2006 | Kikuzawa | |
| 2003/0142218 A1 | * | 7/2003 | Yamazaki | H04N 5/23248 348/208.6 |
| 2003/0193584 A1 | * | 10/2003 | Malkin | H04N 5/208 348/252 |
| 2004/0017386 A1 | * | 1/2004 | Liu | G08B 13/19643 345/647 |
| 2007/0053681 A1 | * | 3/2007 | Arbuckle | F16M 11/10 396/427 |
| 2007/0183762 A1 | * | 8/2007 | Washisu | G03B 5/00 396/53 |

(Continued)

FOREIGN PATENT DOCUMENTS

| | | |
|---|---|---|
| WO | 2016098348 A1 | 6/2016 |
| WO | 2016157621 A1 | 10/2016 |

OTHER PUBLICATIONS

Zhang et al. ("CCD imagers MTF enhanced filter design," IEEE 17th International Conference on Communication Technology, Oct. 27-30, 2017) (Year: 2017).*

(Continued)

*Primary Examiner* — Yubin Hung
(74) *Attorney, Agent, or Firm* — Snyder, Clark, Lesch & Chung, LLP (57) ABSTRACT

A method and apparatus are disclosed. The method may include determining a current zoom value of a camera and determining a first modulation transfer function of a transparent dome of the camera. The method may include applying a first low-pass filter to an image captured by the camera based on the current zoom value and the first modulation transfer function of the transparent dome.

20 Claims, 9 Drawing Sheets

(56) References Cited

U.S. PATENT DOCUMENTS

| | | | |
|---|---|---|---|
| 2007/0206237 A1* | 9/2007 | Oguri | H04N 1/4092 |
| | | | 358/482 |
| 2008/0143881 A1* | 6/2008 | Tsukioka | G06T 5/20 |
| | | | 348/631 |
| 2009/0324135 A1* | 12/2009 | Kondo | G06T 3/4038 |
| | | | 382/284 |
| 2010/0013947 A1* | 1/2010 | Oikawa | G03B 13/36 |
| | | | 348/222.1 |
| 2012/0236137 A1* | 9/2012 | Kawashima | G02B 5/005 |
| | | | 348/79 |
| 2013/0258115 A1* | 10/2013 | Hansson | H04N 5/232 |
| | | | 348/187 |
| 2013/0265436 A1* | 10/2013 | Rehn | H04N 7/181 |
| | | | 348/159 |
| 2013/0286172 A1* | 10/2013 | Sasaki | A61B 1/00009 |
| | | | 348/65 |
| 2015/0053844 A1* | 2/2015 | Kitamura | G02B 3/005 |
| | | | 250/208.1 |
| 2016/0028973 A1 | 1/2016 | Chino | |
| 2016/0042254 A1* | 2/2016 | Miyauchi | G06K 9/6256 |
| | | | 382/159 |
| 2017/0374282 A1* | 12/2017 | Naruse | G03B 15/00 |
| 2018/0020135 A1 | 1/2018 | Aoi et al. | |
| 2018/0024416 A1* | 1/2018 | Kishine | G03B 17/02 |
| | | | 359/614 |

OTHER PUBLICATIONS

Hallabia et al. ("A remote sensing fusion approach using MTF-adjusted filter banks," 2nd International Conference on Advanced Technologies for Signal and Image Processing, Mar. 21-23, 2016) (Year: 2016).*

Vivone et al. ("A Critical Comparison Among Pansharpening Algorithms," IEEE Transactions on Geoscience and Remote Sensing, vol. 53, No. 5, May 2015) (Year: 2015).*

* cited by examiner

IMAGE NOISE REDUCTION BASED ON A MODULATION TRANSFER FUNCTION OF A CAMERA DOME

BACKGROUND

Cameras and other monitoring devices have become less expensive over the years. As a result, their use has become more widespread. As cameras and monitoring devices proliferate, manufacturers are designing and incorporating many features into such devices based on measured or computed device characteristics.

SUMMARY

A method may comprise determining a current zoom value of a camera, determining a first modulation transfer function of a transparent dome of the camera, and applying a first low-pass filter to an image captured by the camera based on the current zoom value and the first modulation transfer function of the transparent dome.

The method may also include determining a portion, of the transparent dome, through which light for a current field of view enters the camera, and determining a measurement of the light for the portion of the transparent dome. In one embodiment, determining the first modulation transfer function of the transparent dome may be based on the measurement made for the portion of the transparent dome.

Determining a measurement may include determining a plurality of measurements of the light when the camera is at a plurality of points on a path. Determining the first modulation transfer function may include determining values for the first modulation transfer function when the camera is at locations other than the plurality of points. In one embodiment, determining the values for the first modulation transfer function may include using a geometrical symmetry to infer the values based on the measurements.

The method may further include determining a portion, of the transparent dome, through which light for a current field of view of the camera enters the camera. Determining the first modulation transfer function of the transparent dome may include calculating values for the first modulation transfer function based on a mathematical model of the portion of the transparent dome.

The modulation transfer function may include a low pass filter with a dome cutoff frequency. In one embodiment, a cutoff frequency of the first low pass filter is calculated based on the dome cutoff frequency and the current zoom value.

The method may further include determining a second modulation transfer function for a lens assembly of the camera; generating a third modulation transfer function by multiplying the first modulation transfer function by the second modulation transfer function over a frequency domain; determining an approximate cutoff frequency of the third modulation transfer function; and setting the cutoff frequency of the first low pass filter equal to the approximate cutoff frequency of the third modulation transfer function.

In one embodiment, applying the first low-pass filter to an image captured by the camera may include applying a first low-pass cutoff frequency to a first part of the image and applying a second low-pass cutoff frequency to a second part of the image. The first low-pass cutoff frequency may be different than the second low-pass cutoff frequency.

A device may comprise a memory to store a modulation transfer function, a transparent dome through which light passes to a lens assembly, and a processor. The lens assembly may receive the light and forming an image at a sensor array. The sensor array may capture capturing the image. The processor may capture the image via the sensor array, determine a current zoom value of the lens assembly, determine a first modulation transfer function, among the modulation transfer functions, of the transparent dome, and apply a first low-pass filter to the captured image based on the current zoom value and the first modulation transfer function of the transparent dome.

The device may include a network interface. The processor may be configured to compress the image as part of a video in accordance with a standard, and transmit the compressed video through the network interface.

In one embodiment, the standard may be a moving picture experts group (MPEG) standard. The processor may be configured to determine a portion, of the transparent dome, through which the light enters the device. The processor may determine the first modulation transfer function of the transparent dome based on measurements made for the portion of the transparent dome.

The processor may make the measurements when the lens assembly is at particular points on a single path. When the processor determines the first modulation transfer function, the processor may determine values for the first modulation transfer function when the lens assembly is at locations other than the particular points. When the processor determines the values for the first modulation transfer function, the processor may use a geometrical symmetry to infer the values based on the measurements.

The processor may be further configured to determine a portion, of the transparent dome, through which the light enters the device. In one embodiment, the processor determines the first modulation transfer function of the transparent dome, and the processor calculates values for the first modulation transfer function based on a mathematical model of the portion of the transparent dome.

In one embodiment, the modulation transfer function may include a low pass filter with a dome cutoff frequency. A cutoff frequency of the first low pass filter may be calculated based on the dome cutoff frequency and the current zoom value.

The processor may be configured to determine a second modulation transfer function for the lens assembly, and generate a third modulation transfer function by multiplying the first modulation transfer function by the second modulation transfer function over a frequency domain. The processor may be configured to determine an approximate cutoff frequency of the third modulation transfer function, and set the cutoff frequency of the first low pass filter equal to the approximate cutoff frequency of the third modulation transfer function.

The processor may be configured to apply the first low-pass filter to an image captured by the camera by applying a first low-pass cutoff frequency to a first part of the image and applying a second low-pass cutoff frequency to a second part of the image. The first low-pass cutoff frequency is different than the second low-pass cutoff frequency.

A computer-readable storage medium may comprise computer executable instructions that cause, when executed by a processor of a camera, cause the processor to capture an image via a sensor array of the camera, determine a current zoom value of a lens assembly of the camera, determine a first modulation transfer function of a transparent dome of the camera, and apply a first low-pass filter to the captured image based on the current zoom value and the first modulation transfer function of the transparent dome.

The computer-readable storage medium may include instructions, when executed by the processor, cause the processor to compress the image as part of a video in accordance with a standard, and transmit the compressed video through a network interface of the camera.

The computer-readable storage medium may include instructions, when executed by the processor, cause the processor to determine a portion, of the transparent dome, through which light enters the camera. The processor may determine the first modulation transfer function of the transparent dome based on measurements made for the portion of the transparent dome.

The computer-readable storage medium may include instructions that cause the processor to make the measurements when the lens assembly is at particular points on a single path. When the processor determines the first modulation transfer function, the processor may determine values for the first modulation transfer function when the lens assembly is at locations other than the particular points. When the processor determines the values for the first modulation transfer function, the processor may use a geometrical symmetry to infer the values based on the measurements.

DETAILED DESCRIPTION OF EMBODIMENTS

The following detailed description refers to the accompanying drawings. The same reference numbers in different drawings may identify the same or similar elements.

The term "image," as used herein, refers to an analog or digital representation of visual information (e.g., a picture, a video, a photograph, an animation, etc). The term "image" may also be used to mean "image sensor data" or any data describing an image.

The term "camera," as used herein, includes a device that captures and stores images. For example, a digital camera may include an electronic device that captures and stores images electronically instead of using photographic film. A digital camera may be multifunctional, with some devices capable of recording sound and/or images. As used herein, the term "light" may not only refer to visible light, but also light (e.g., electromagnetic radiation) in non-visible spectra.

Figure 1A:
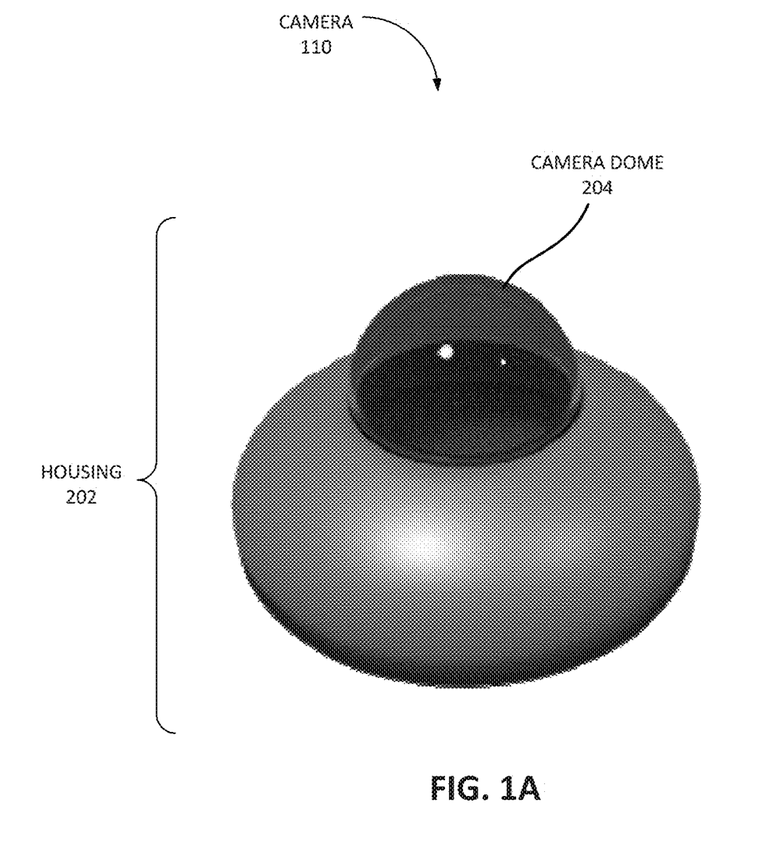
FIG. 1A is a perspective view of an exemplary camera according to one embodiment.

In the following example, a camera reduces image noise based on a modulation transfer function (MTF) of a camera dome and a zoom level of the camera (e.g., magnification). FIG. 1A illustrates an exemplary camera 110 in one embodiment. As shown, camera 110 includes a housing 202, which in turn includes a camera dome 204. Camera dome 204 is transparent and allows light to reach optical components (e.g., lenses) within housing 202 while providing a protection against external elements.

A camera cannot capture image components whose spatial frequencies are above the cutoff frequency $f_s$ of its sensor array. Accordingly, if an image does not have spatial frequencies above cutoff frequency and this image cutoff frequency $f_i$ is greater than sensor cutoff frequency $f_s$, frequencies that are greater than sensor cutoff frequency $f_s$ (including frequencies greater than image cutoff frequency $f_i$) are not captured by the sensor array (other than those captured due to aliasing). Frequencies above the sensor cutoff frequency $f_s$ may be noise added by the sensor array itself, for example. If, however, image cutoff frequency $f_i$ is less than sensor cutoff frequency $f_s$, the sensor array may capture noise whose spatial frequency components are above image cutoff frequency $f_i$ (but less than sensor cutoff frequency $f_s$).

The latter situation can occur in camera 110 of FIG. 1A. As light passes through dome 204, dome 204 may operate as a filter (e.g., a low-pass filter) with a cutoff spatial frequency $f_c$, causing the spatial frequency of any subsequent image to become band limited. When the lens assembly (not shown) of camera 110 is zoomed, the cutoff spatial frequency of any resulting image decreases (e.g., in proportion to or in accordance with approximately the magnification Z of the zoom). For example, in one embodiment, for the image incident on the sensor array, the cutoff spatial frequency $f_i$ may be considered to be approximately given by $f_c/Z$.

Although dome 204 is designed so that its cutoff frequency fc is greater than the cutoff frequency fs of the sensor ($f_c > f_s$), it may be that, after zooming, the cutoff frequency $f_i$ of the image incident on the sensor (e.g., $f_c/Z$) is less than the cutoff frequency of the sensor $f_s$. If so, after the zoom, when the sensor array of camera 110 captures the image incident on the sensor array, the sensor array may also capture noise components whose frequencies are above image cutoff frequency $f_i$.

If image cutoff frequency $f_i$ is indeed less than sensor cutoff frequency $f_s$ for a particular zoom magnification Z, camera 110 can filter out the spatial frequency components above cutoff frequency $f_i$ as noise from the captured image. With higher spatial frequencies removed from the image, the image can be compressed more than could be without the removal. Put another way, compression may ignore spatial frequencies above image cutoff frequency fi, effectively filtering these spatial frequencies out of the captured image and making the compression more efficient. This compression potentially saves bandwidth when storing or transmitting the compressed image over networks, e.g., without necessarily losing information.

Figure 1B:
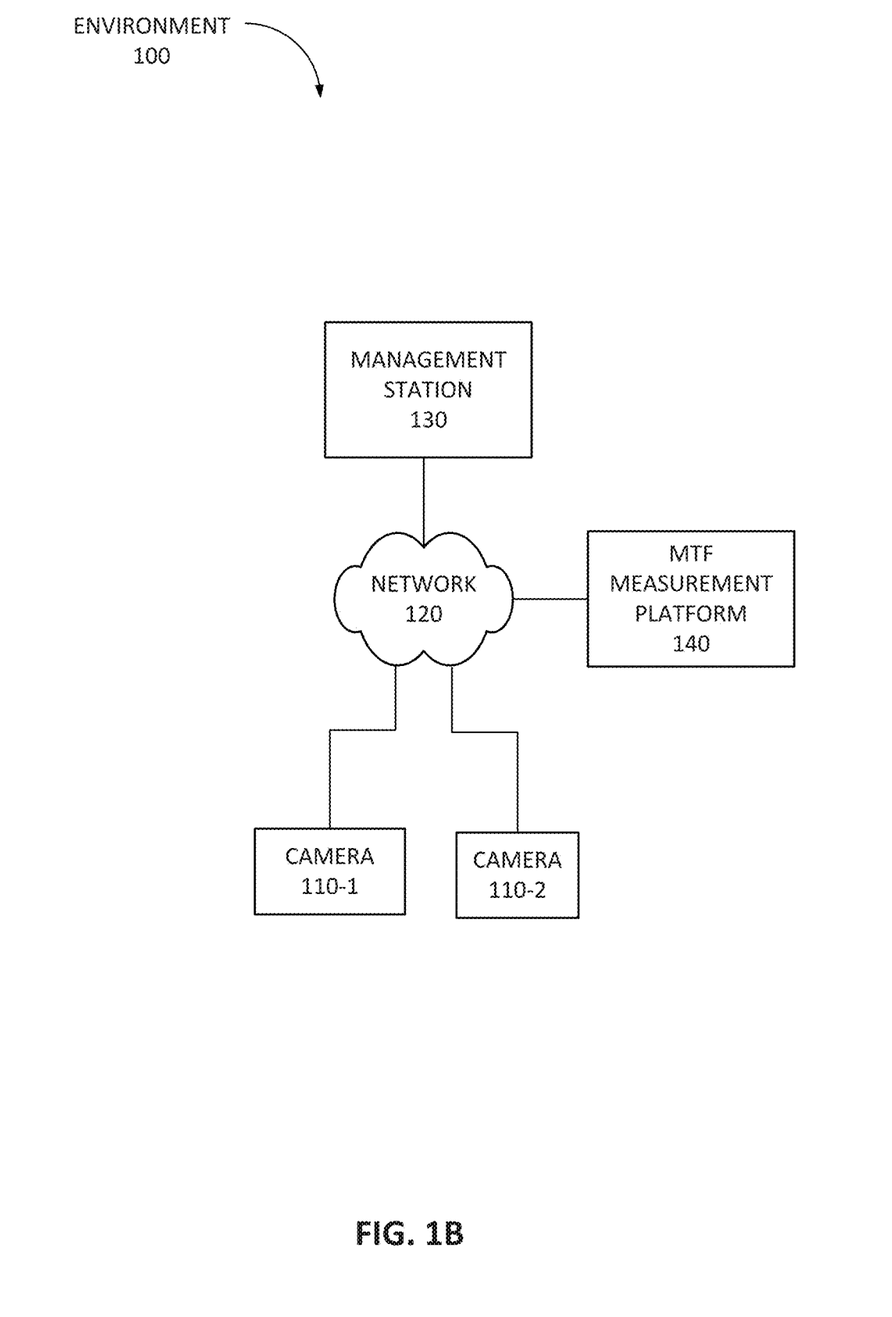
FIG. 1B illustrates an exemplary environment in which embodiments described herein may be implemented.

FIG. 1B illustrates an exemplary environment 100 in which embodiments described herein may be implemented. As shown, environment 100 may include a cameras 110-1 and 110-2 (collectively referred to as cameras 110 and individually as camera 110), network 120, and management station 130.

Camera 110 may include, for example, a video camera that captures image data using visible light, infrared light, and/or other non-visible electromagnetic radiation (e.g., camera 110 may include a radar for radar imaging). The captured image data may include a continuous image sequence (e.g., video), a limited image sequence, still images, and/or a combination thereof. Camera 110 may include a digital camera for capturing and digitizing images.

Network 120 enables devices in environment 100 to communicate with each other. For example, cameras 110 may communicate with each other or management station 130. Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, a wireless mesh network, an intranet, the Internet, a fiber optic-based network, a wireless network, and/or a combination of these or other types of networks.

Management station 130 may include any computing device for communicating with camera 110. For example, management station 130 may include a personal computer or a workstation (e.g., with a display, keyboard, mouse, etc.), a server device, a laptop, a tablet computer, a portable communication device (e.g., a mobile phone, a smart phone, and/or another type of wireless device), and/or any type of device with computational and communication capability.

Camera 110 may send data to management station 130 through network 120. For example, camera 110 may stream images or video to management station 130 for a person to view on a display. Management station 130 may also send data through network 120 to camera 110.

Modulation transfer function (MTF) measurement platform 140 may include hardware and/or software components for measuring MTFs of different optical components of camera 110. MTF measurement platform 140 may measure MTFs for camera dome 204, for example. MTF measurement platform 140 may be implemented as software, in which case MTF measurement platform 140 may be installed and used on camera 110. Once MTFs have been measured, the measured MTF data may be sent to camera 110, management station 130, or another device (e.g., a storage device) over network 120 to be stored and/or used.

Although FIG. 1B shows exemplary components of environment 100, in other implementations, environment 100 may include fewer components, different components, differently arranged components, or additional components than depicted in FIG. 1B. For example, environment 100 may include many cameras 110. Additionally or alternatively, any one device (or any group of devices) may perform functions described as performed by one or more other devices. For example, a camera 110 may perform the functions of management station 130. Alternatively, cameras 110 may perform the functions of management station 130 in a distributed manner.

Figure 2:
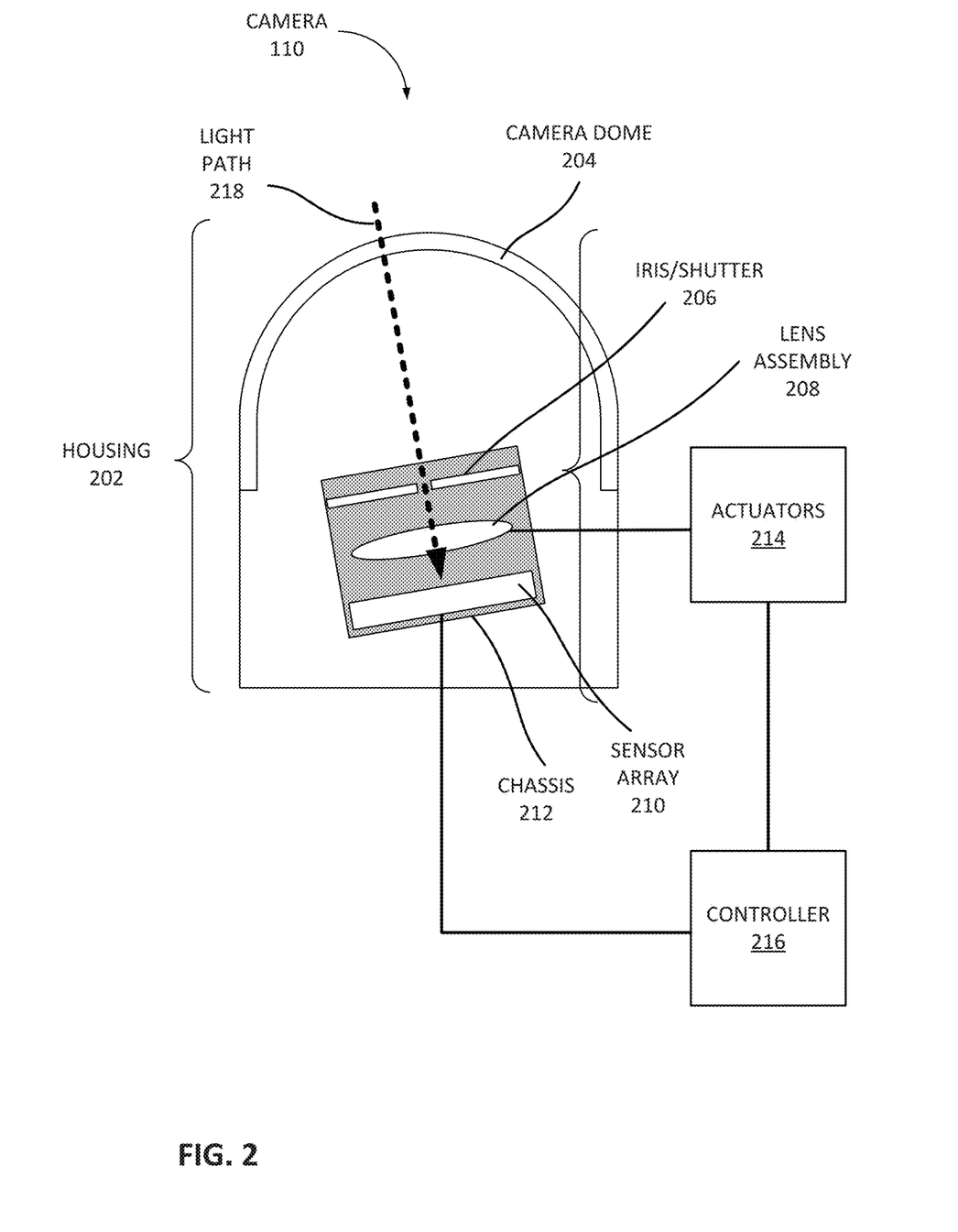
FIG. 2 illustrates exemplary components of the camera of FIGS. 1A and 1B.

FIG. 2 illustrates exemplary components of camera 110 in one embodiment. As shown in FIG. 2, camera 110 may include a housing 202, iris/shutter 206, lens assembly 208, sensor array 210, chasses 212, actuators 214, and controller 216.

Housing 202 protects components of camera 110 from external elements. For camera 110 in FIG. 2, housing 202 encloses iris/shutter 206, lens assembly 208, sensor array 210, and chasses 212. Although not illustrated, housing 202 may enclose additional components, depending on the implementation. For example, in one implementation, housing 202 may enclose actuators 214 and controller 216. As shown, housing 202 includes a camera dome 204.

Camera dome 204 may include glass, plastic, and/or any other transparent material. Camera dome 204 may be partly shaped as a hemispherical shell in combination with a short cylindrical shell, to allow light to pass through dome 204 to lens assembly 208 while protecting the components of camera 110 from external elements. With its shape and its index of refraction, camera dome 204 can act like a "lens" that affects light that passes through dome 204 to lens assembly 208 within housing 202.

Iris/shutter 206 provides an opening for light to reach lens assembly 208 and/or other internal optical components of camera 110. Depending on the embodiment, iris/shutter 206 may include optical stops (e.g., shutter) or another type of optical component (e.g., neutral density filter). In one embodiment, iris/shutter 206 may adjust the size of its opening or the duration of opening to control the amount of light that reaches sensor array 210 and is captured by sensor array 210. Although iris/shutter 206 is illustrated as positioned in front of lens assembly 208, in one implementation, each component of iris/shutter 206 may be located at any point, on a light path 218, suitable for adjusting the amount of light that reaches sensor array 210.

Lens assembly 208 may include a device for manipulating light from a given or a selected direction and/or range, so that images in the direction and/or range can be captured in a desired manner. Lens assembly 208 may include different types of lenses (e.g., convex, concave, reflective, etc.). In one embodiment, lens assembly 208 may include a set of zoom lenses for performing an optical zoom.

Sensor array 210 may include an array of sensors for registering, sensing, and measuring light incident or falling onto sensor array 210. The light may be in the visible spectrum, the infrared spectrum, or other wavelength ranges. Sensor array 210 may include, for example, a charged coupled device (CCD) array and/or an active pixel array (e.g., a complementary metal-oxide-semiconductor (CMOS) sensor array).

Sensor array 210 may be associated with a cutoff spatial frequency $f_s$. Sensor array 210 may not register, sense, and/or measure image components whose spatial frequencies are above cutoff frequency $f_s$. Depending on the embodiment, cutoff frequency $f_s$ may be obtained from the resolution R of sensor array 210 (e.g., pixels per unit length). For example, cutoff frequency $f_s$ may be calculated as $f_s = \alpha R$, where a is a known constant. Alternatively, cutoff frequency $f_s$ may be obtained from the resolution of sensor array 210 and/or an MTF that characterize sensor array 210.

Sensor array 210 outputs data that is indicative of (e.g., describes properties or characteristics) the light incident on sensor array 210. For example, the data output from sensor array 210 may include information such as the intensity of light (e.g., luminance), color, etc., incident on one or more pixels in sensor array 210. The light incident on sensor array 210 may be an image formed from light focused by lens assembly 208. Sensor array 210 may provide picture elements, or "pixels." As used herein, a "pixel" may mean any region or area of sensor array 210 for which measurement(s) of light are taken (e.g., measurements that are indicative of the light incident on sensor array 210). A pixel may correspond to one or more (or less than one) sensor(s) in sensor array 210. A pixel for sensor array 210 may be different from a pixel of a display.

Chassis 212 provides a structure for mounting different optical components, such as iris/shutter 206, lens assembly 208, and/or sensor array 210. When chasses 212 changes its position (e.g., coordinates or orientation), all components mounted on chasses 212 may also change their positions and orientations, about the center of chassis axis.

Actuators 214 may include electromechanical components (e.g., servomotors) for modifying a physical configuration of components of camera 110 based on input from controller 216. In one embodiment, actuators 214 may change, for example, the magnification of lens assembly 208, modify the location of the image plane of lens assembly 208 by repositioning one or more of the lenses, and/or change the size of the opening of iris/shutter 206 to admit more or less light. In another example, based on input from controller 216, actuators 214 may change the direction of chasses 212 and thus the direction of lens assembly 208.

Controller 216 controls the operation of sensor array 210 and/or actuators 214 based on input from other sensors (not shown), sensor array 210, etc. For example, controller 216 may send control signals to actuators 214 to change the direction of lens assembly 208, the size of the opening of iris/shutter 206, etc. Controller 216 may also provide for other functions of camera 110, such as presenting a graphical user interface (GUI) to a user, applying digital signal processing (e.g., noise reduction), applying a digital zoom, retrieving or storing images, running an application, and/or communicating with other devices over a network (e.g., transmitting images to management device 130, and/or sending/receiving alerts to detected events).

The components shown in FIG. 2 are exemplary. In other embodiments, camera 110 may be implemented as a radar, for example. In other implementations, camera 110 may include fewer components, different components, differently arranged components, or additional components than depicted in FIG. 2. For example, camera 110 may include additional sensors and/or detectors and optical components (e.g., filters). Additionally or alternatively, one or more components of camera 110 may perform functions described as performed by one or more other components of camera 110.

Figure 3:
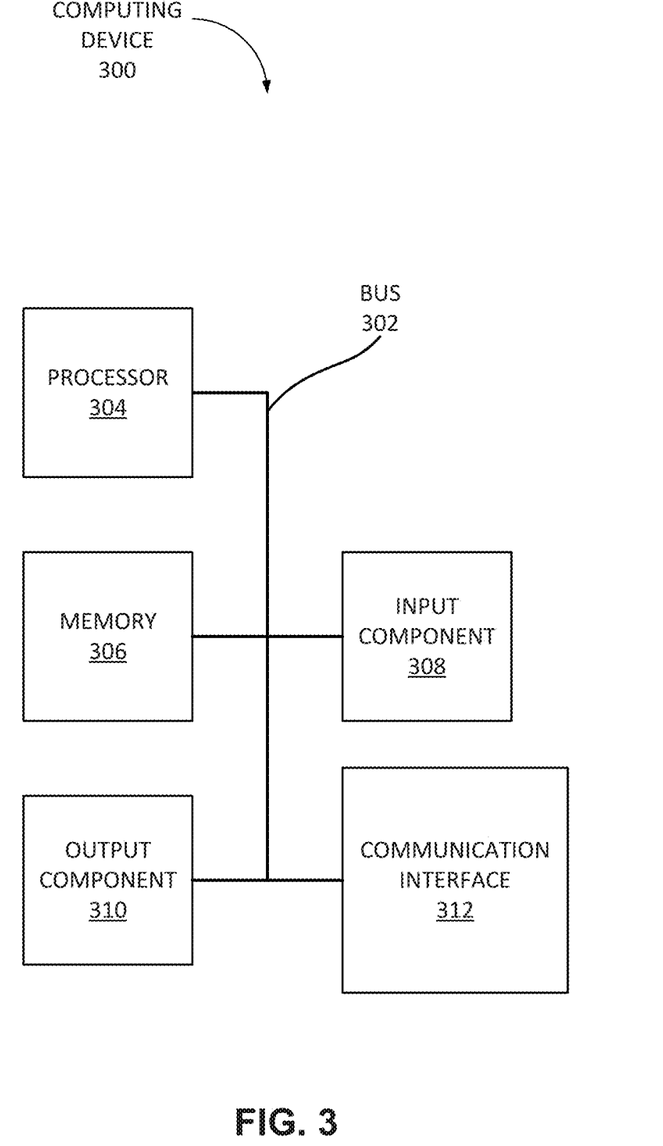
FIG. 3 is a block diagram of exemplary components of a computing device in one embodiment.

FIG. 3 is a block diagram illustrating exemplary components of a computing device 300 in one embodiment. Controller 216 in camera 110 and management station 130 may each include a computing device 300. As shown in FIG. 3, computing device 300 may include a bus 302, a processor 304, a memory 306, a storage device 308, an input component 308, an output component 310, and a communication interface 312.

Bus 302 includes a path that enables communication among the components of computing device 300. Processor 304 may include any type of single-core processor, multi-core processor, microprocessor, latch-based processor, and/or processing logic (or families of processors, microprocessors, and/or processing logics) that interprets and executes instructions. In other embodiments, processor 304 may include an application-specific integrated circuit (ASIC), field-programmable gate array (FPGA), and/or another type of integrated circuit or processing logic. Processor 304 may include a hardware accelerator, such as a graphical processing unit (GPU). In some embodiments the hardware accelerator may include an ASIC, an FPGA, another type of integrated circuit, one or more specialized integrated circuits (e.g., with hardwired digital and/or analog circuits), etc. The hardware accelerator may be implemented on a different chip than processor 304 or as a part of processor 304.

Memory 306 may include any type of volatile and/or non-volatile storage device that stores information and/or instructions. Memory 306 may include a random access memory (RAM) or any type of dynamic storage device, a read-only memory (ROM) device or any type of static storage device. Memory 306 may also or alternatively include a magnetic and/or optical storage/recording medium. In some embodiments, some or all of memory 306 may be mounted under a directory tree or may be mapped to a drive. The term "medium," "memory," "storage," "storage device," "storage medium," and/or "storage unit" is used herein interchangeably. For example, a "computer-readable storage device" or "computer readable storage medium" may refer to a memory and/or storage device.

Input component 308 may permit a user to input information to computing device 300. Input component 308 may include, for example, a microphone, a touch screen, voice recognition and/or biometric mechanisms, infrared sensors, touch-screen sensors, acoustic sensors, etc. Output component 310 may output information to the user. Output component 310 may include, for example, a display, a speaker, etc.

Communication interface 312 may include a transmitter and/or receiver (e.g., transceiver) that enables computing device 300 to communicate with other components, devices, and/or systems. Communication interface 312 may communicate via wireless communications (e.g., radio frequency, infrared, etc.), wired communications, or a combination thereof. Communication interface 312 may include a transceiver that converts baseband signals to radio frequency (RF) signals or vice versa and may be coupled to an antenna.

Communication interface 312 may include a logical component that includes input and/or output ports, input and/or output systems, and/or other input and output components that facilitate the transmission of data to other devices. For example, communication interface 312 may include a network interface card (e.g., Ethernet card) for wired communications or a wireless network interface (e.g., a WiFi) card for wireless communications.

Computing device 300 may perform the operations described herein in response to processor 304 executing software instructions stored in a non-transient computer-readable medium, such as memory 306. The software instructions may be read into memory 306 from another computer-readable medium or from another device via communication interface 312. The software instructions stored in memory 306, when executed by processor 304, may cause processor 302 to perform processes that are described herein. For example, as a camera 110, programs (which are shown as functional components in FIG. 4) run by computing device 300 may direct camera 110 to perform a concurrent digital and optical zoom.

Computing device 300 may include other components (not shown) that aid in receiving, transmitting, and/or processing data. Moreover, other configurations of components in computing device 300 are possible. In other implementations, computing device 300 may include fewer components, different components, additional components, or differently arranged components than depicted in FIG. 3. Additionally or alternatively, one or more components of computing device 300 may perform one or more tasks described as being performed by one or more other components of computing device 300.

Figure 4:
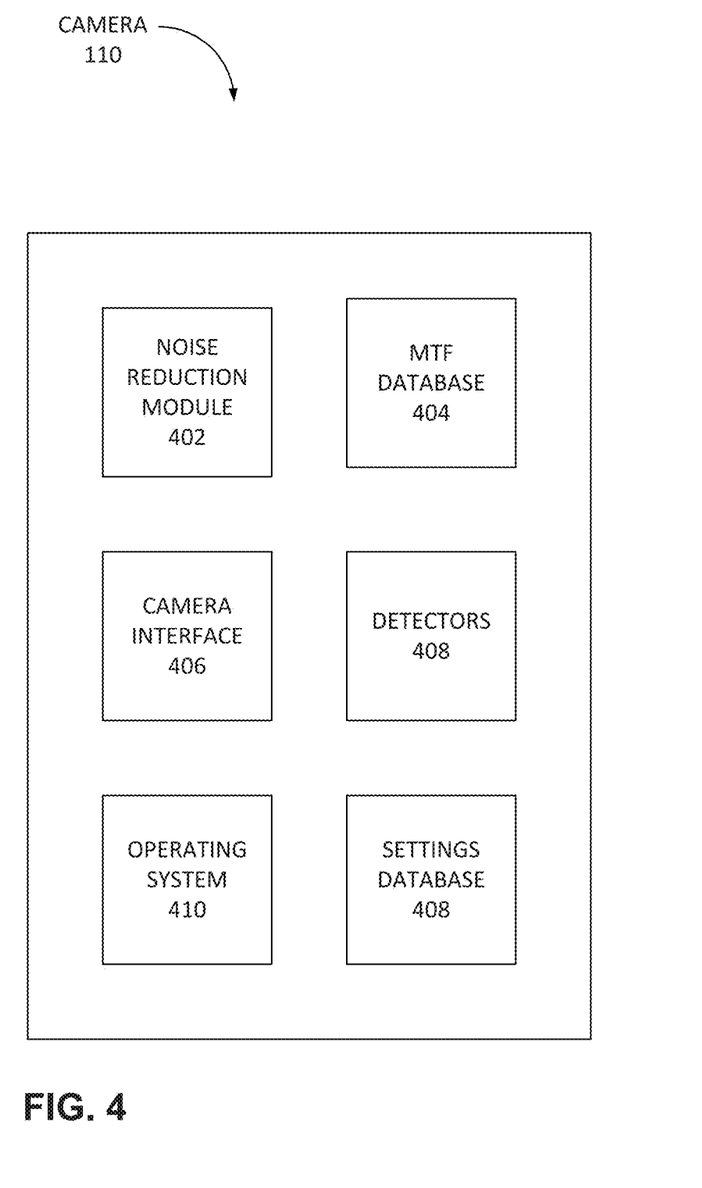
FIG. 4 is a block diagram illustrating exemplary functional components of the camera of FIGS. 1A, 1B, and 2.

FIG. 4 is a block diagram illustrating exemplary functional components of camera 110. As shown, camera 110 may include a noise reduction module 402, a modulation transfer function (MTF) database 404, a camera interface 406, detectors 408, an operating system 410, and a settings database 412. Although components 402-412 are implemented as software in the example of FIG. 4, in other embodiments, components 402-412 may be implemented as hardware or a combination of hardware and software.

Noise reduction module 402 may remove, when requested by another component of camera 110, high frequency part of noise from a captured image under particular conditions. Assume that sensor array 210 has a cutoff spatial frequency $f_s$ and that the image at sensor array 210 is band limited with a cutoff frequency $f_i$. As explained above, if image cutoff frequency $f_i$ is greater than the sensor cutoff frequency $f_s$ ($f_i > f_s$), any noise (e.g., noise added by sensor array 210 itself) whose frequencies are greater than either cutoff frequency (e.g., $f_i$ and/or $f_s$) is excluded from the captured image due to the limited resolving image power of sensor array 210. In this situation, noise reduction module 402 may not attempt to filter the noise from the captured image (but noise reduction may nonetheless occur for other reasons and/or in other parts of camera 110).

If, however, the image cutoff frequency $f_i$ is less than the sensor cutoff frequency $f_s$ ($f_i < f_s$), sensor array 210 may have captured or introduced noise whose frequency components are above the image cutoff frequency $f_i$ (and also less than sensor cutoff frequency $f_s$) along with the image. In such cases, noise reduction module 402 may act to remove the noise. To determine whether to remove the noise, noise reduction module 402 may evaluate, calculate, or determine the image cutoff frequency so that it can test whether it is less than the sensor cutoff frequency ($f_i < f_s$).

In one embodiment, noise reduction module 402 may determine the image cutoff frequency $f_i$ based on a zoom level Z of camera 110 and the MTF of camera dome 204.

An MTF may be expressed as:

$$M(\omega) = |H(\omega)|^2 \quad (1)$$

$H(\omega)$ is an amplitude transfer function. In one embodiment, the amplitude transfer function is a Fourier transform of a point spread function that describes an image generated from light, from a point source, passing over a target (e.g., lens, iris, shutter, an obstruction, etc.). The image is located at an image plane (e.g., on a sensor array) associated with the target.

MTF $M(\omega)$ relates a contrast of the image as a function of $\omega$, spatial frequency. For dome 204, MTF $M(\omega)$ includes a low-pass filter with a cutoff frequency $f_c$. If the light associated with an image with a constant contrast over a large range of $\omega$ passes through camera dome 204, before the image enters lens assembly 208, the image would have $f_c$ as its cutoff frequency. Variable $\omega$ is measured in terms of line pairs per millimeter (lp/mm) and relates to frequencies of sine/cosine components of an image.

When light associated with an image passes through lens assembly 208, lens assembly 208 decreases the resolution of the image (e.g., in proportion to or in accordance with the magnification Z). In different words, the effect of the zooming is to compress the scale of the w axis (e.g., approximately by the factor of the magnification Z). For example, in one embodiment, the image cutoff frequency $f_i$ may be expressed in terms of the dome cutoff frequency $f_c$ and the magnification Z:

$$f_i = f_c/Z \quad (2)$$

Other equations may additionally or alternatively express the relationship between image cutoff frequency $f_i$ and dome cutoff frequency $f_c$. Cutoff frequency $f_i$ is also the cutoff frequency associated with the light after it leaves lens assembly 208 and before it enters sensor array 210. To determine image cutoff frequency $f_i$, noise reduction module 402 may determine or receive the dome cutoff frequency $f_c$. The magnification Z may also be provided to noise reduction module 402 or be obtained via camera interface 406.

Figure 5A:
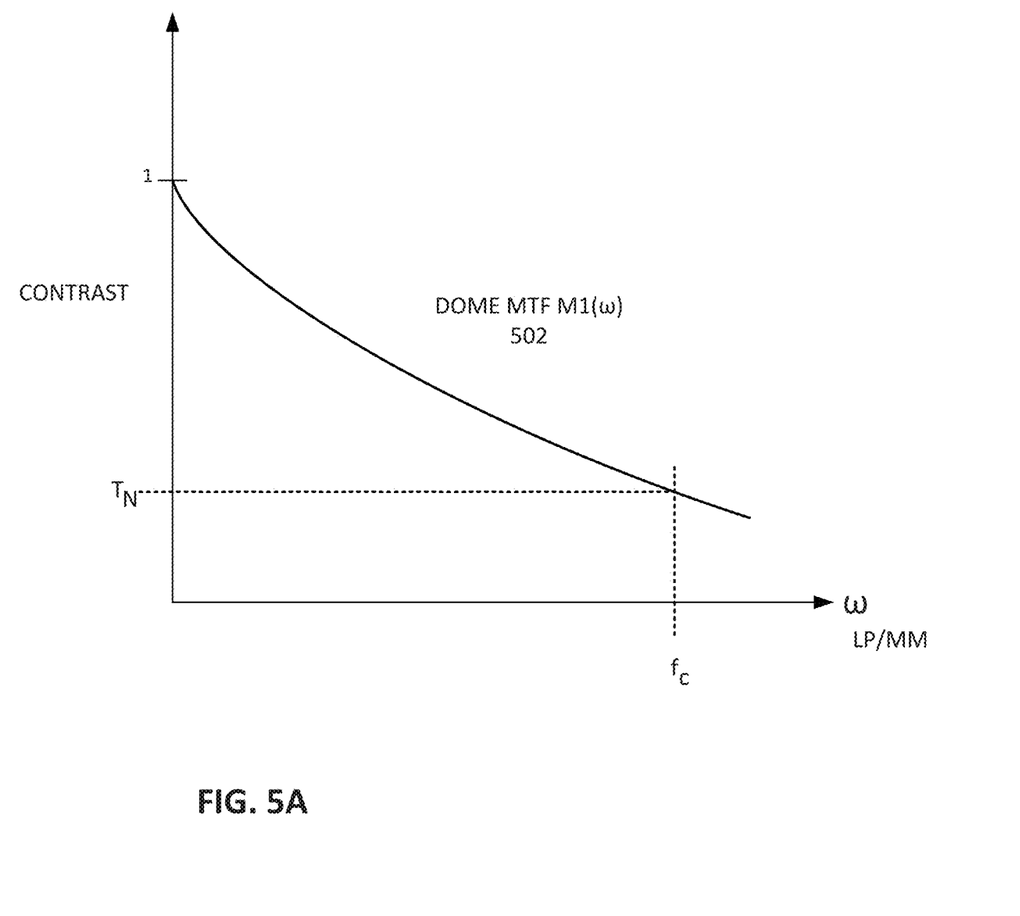
FIGS. 5A and 5B illustrate a modulation transfer function of the camera dome of FIGS. 1A and 2.

To determine the dome cutoff frequency $f_c$, noise reduction module 402 may determine or retrieve the MTF of camera dome 204 from MTF database 404. FIG. 5A illustrates an exemplary MTF $M1(\omega)$ of camera dome 204 stored, for example, in MTF database 404. As shown, MTF $M1(\omega)$ decreases from the maximum contrast of 1 as a function of increasing frequency $\omega$. Based on MTF $M1(\omega)$, noise reduction module 402 can determine the dome cutoff frequency fc. For example, noise reduction module 402 can determine dome cutoff frequency fc as the lowest frequency $\omega$ at which MTF $M1(\omega)$ is below a threshold contrast $T_N$ (e.g., a predefined threshold), which is approximately about the average magnitude of noise at sensor array 210.

With the dome cutoff frequency $f_c$ determined, e.g., based on the MTF $M1(\omega)$ of dome 204, noise reduction module 402 can determine image cutoff frequency $f_i$ based on expression (2) (e.g., based on the dome cutoff frequency $f_c$ and the magnification Z). In one embodiment, the image cutoff frequency $f_i$ can be the same for the entire image.

In another embodiment, the image cutoff frequency $f_i$ can be different for different parts of an image. For example, if part of an image is behind a glass door, the glass door may be treated similar to a dome on the camera or similar to a lens and the glass door may be associated with an MTF. For objects behind the glass door, a different image cut off frequency $f_i$ may be determined. For objects in front of the glass door or not near (e.g., to the side of) the glass door, a different image cut off frequency $f_i$ may be determined. In this embodiment, an operator may define an area that includes the glass door, and the camera may use object detection to determine whether an object is in front of the glass door or behind the glass door. As another example, different parts of the glass dome may be associated with different MTFs, such as the spherical part of the dome and the cylindrical part of the dome. In this situation, if the current field of view is associated with the different parts of the dome, then the image cutoff frequency $f_i$ may also be different for different parts of the image.

The noise reduction module 402 can also determine whether the image cutoff frequency $f_i$ is less than sensor cutoff frequency $f_s$ ($f_i < f_s$). The sensor cutoff frequency $f_s$ may be determined, for example, based on either the resolution of sensor array 210 or the MTF of sensor array 210. Alternatively or additionally, sensor cutoff frequency $f_s$ may be pre-computed or predetermined, stored in memory 306, and retrieved for testing $f_i < f_s$.

If the image cutoff frequency $f_i$ is less than the sensor cutoff frequency ($f_i < f_s$), noise reduction module 402 may apply a low-pass filter, whose cutoff frequency is also $f_i$, to the captured image to remove components from the captured image whose frequencies are above image cutoff frequency $f_i$. If components with frequencies above the image cutoff frequency fi (e.g., $f_c/Z$) are in the image captured at sensor array 210, the components likely were added by sensor array 210 (or any other optical component that comes after lens assembly 208 of camera 110) and likely represent noise.

According to one embodiment, to apply the low-pass filter, noise reduction module 402 takes a discrete Fourier transform (DFT) of the captured image to obtain $X(\omega)$, and zeroes out the coefficients for the terms for frequencies above the image cutoff frequency $f_i$ to obtain $Y(\omega)$. If the low-pass filter's transfer function is denoted $L(\omega)$, then the result of applying the low-pass filter is given by:

$$Y(\omega) = L(\omega)X(\omega) \quad (3)$$

As discussed above, the cutoff frequency of $L(\omega)$ can be set to the image cutoff frequency $f_i$. In one embodiment, the cutoff frequency of $L(\omega)$ can be different for different parts of the image. In another embodiment, the $L(\omega)$ may have the same cutoff frequency for the entire image. After $Y(\omega)$ is computed, noise reduction module 402 may determine the filtered image by taking the inverse DFT of Y(ω). Noise reduction module 402 may apply a filter, such as a low-pass filter, in a way other than expressed by expression (3), for example.

Because the filtered image does not include components with frequencies above $f_c/Z$ (e.g., the image cutoff frequency $f_i$), an MPEG encoder (or any other encoder that uses a Discrete Cosine Transform (DCT)), for example, can compress the filtered image more effectively than the unfiltered, captured image. During the encoding, the terms for high frequency components of the image are set to zero, and therefore, the filtered image can be represented by fewer number of non-zero coefficients. The greater compression translates to fewer bytes, and hence, leads to bandwidth savings during transmission of the processed image.

In some embodiments, noise reduction module 402 may determine the image cutoff frequency $f_i$ not just based on MTF M1(ω) of dome 204 and the magnification Z, but also an MTF of lens assembly 208, denoted M2(ω).

Figure 5B:
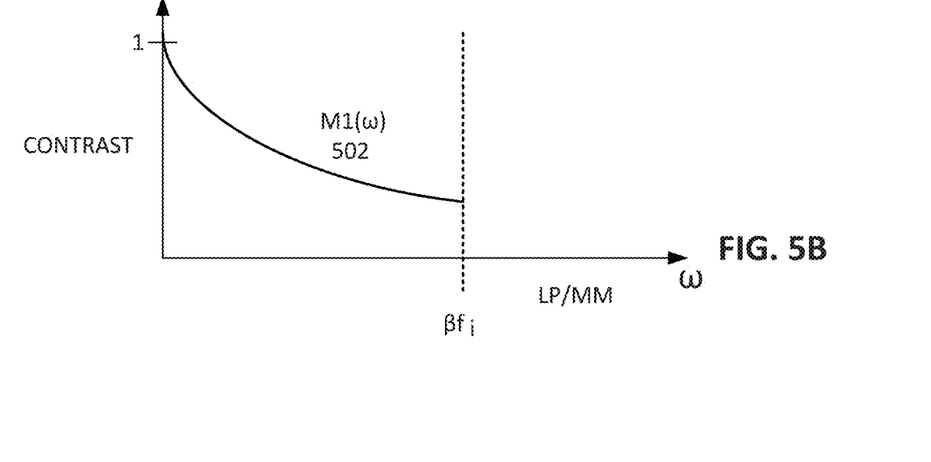
Figure 5C:
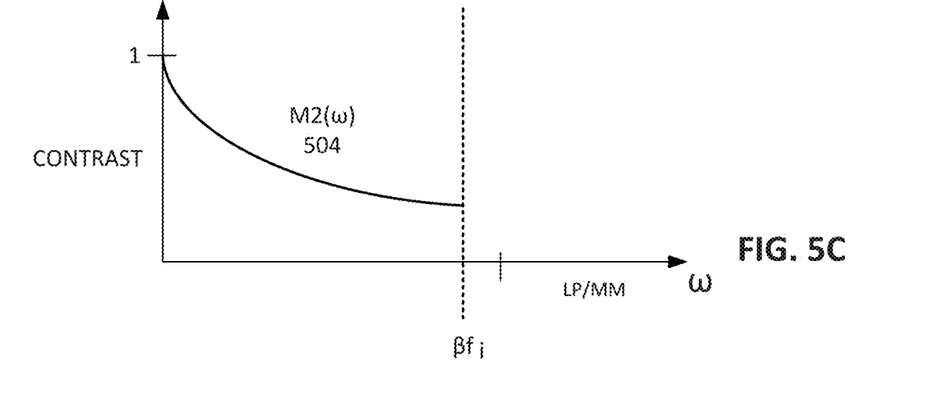
FIG. 5C illustrates a modulation transfer function of the lens assembly of FIG. 2.

FIG. 5B re-illustrates MTF M1(ω) and FIG. 5C illustrates MTF M2(ω). Both MTFs M1(ω) and M2(ω) may be retrieved from MTF database 404. After obtaining MTFs M(ω) and M2(ω), noise reduction module 402 may generate an MTF M3(ω), expressed as:

$$M3(\beta\omega)=M(\omega)M2(\omega) \qquad (4)$$

Figure 5D:
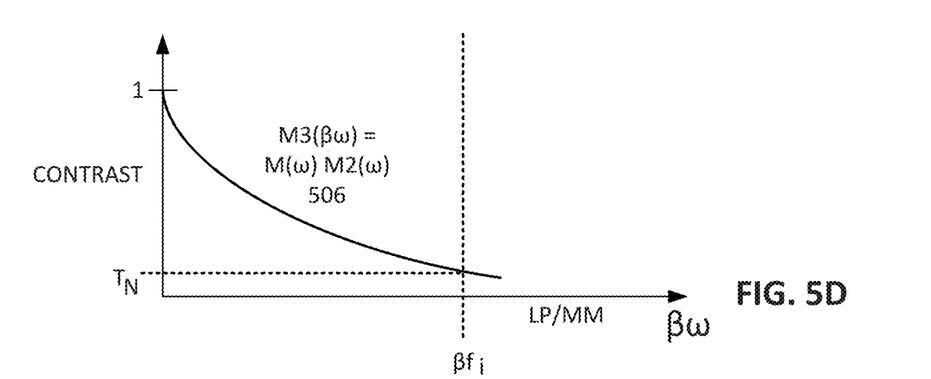
FIG. 5D illustrates a modulation transfer function derived from the modulation transfer functions of FIGS. 5B and 5C.

FIG. 5D illustrates M3(βω). MTF M3(βω) represents a modulation transfer function of the combination of camera dome 204 and lens assembly 208. Scalar β represents a scaling factor to adjust for the changed image size at sensor array 210 due to the zoom. In one implementation, β may be set to Z.

Having determined M3(ω), noise reduction module 402 may identify image cutoff frequency $f_i$ as the frequency at which M3(ω) is attenuated to the level of noise threshold $T_N$. Based on image cutoff frequency $f_i$, noise reduction module 402 can then test whether it is less than the sensor cutoff frequency $f_s$ ($f_i<f_s$). If so ($f_i<f_s$), noise reduction module 402 can apply a low-pass filter, with the cutoff frequency set to image cutoff frequency to the image captured at sensor array 210, in the manner described above, to arrive at Y(ω).

In other implementations, noise reduction module 402 may account for the MTFs of other optical components, such as iris/shutter 206, sensor array 210, etc. to obtain M3(ω), rather than just camera dome 204 and/or lens assembly 208.

For example, MTF M3(ω) may be defined as:

$$M3(\omega)=(\text{MTF of Dome }(\omega))\cdot(\text{MTF of iris/shutter }(\omega)) \\ (\text{MTF of lens assembly }(\omega))\cdot(\text{MTF of sensor} \\ \text{array }(\omega)) \qquad (5)$$

In these implementations, the image cutoff frequency $f_i$ may be determined by applying procedures similar to the one discussed above when MTF M3(ω) is given by expression (4).

Returning to FIG. 4, MTF database 404 may include MTFs for different optical components of camera 110. For example, MTF database 404 may include MTFs for camera dome 204, iris/shutter 206, lens assembly 208, sensor array 210, and/or any other optical component of camera 110.

In some implementations, MTF database 404 may include MTFs as a function of different parameters. For example, MTF database 404 may include MTFs for camera dome 204 for different camera orientations.

MTF database 404 may receive MTFs for camera dome 204 (or any other optical component) from MTF measurement platform 140. In other implementations, MTF database 404 may receive MTFs from an analytical tool that computes MTFs based on a material of an optical component, the shape of the optical component, optical properties of the component (e.g., an index of refraction), a component position (e.g., a position at which the output rays from the component is to be received by another optical component).

Continuing with FIG. 4, camera interface 406 may include device drivers for hardware components of camera 110. Other components, such as noise reduction module 402 and detectors 408 may invoke camera interface 406 to obtain measurements (e.g., lens locations, camera 110 orientation, brightness values, etc.), as well as to control various components of camera 110. For example, an application may use camera interface 406 to set a direction of camera 110 by driving actuators 214 (based on measured/calculated camera direction), affect camera aperture size by changing the opening of iris/shutter 206, apply an optical zoom of particular magnification, apply a digital zoom, etc.

Detectors 408 may detect parameters that are associated with an image, such as illumination (or exposure), a focal distance, an effective aperture size, orientation of camera 110, etc. When detectors 408 receive a request for one of the parameter values, detectors 408 may obtain the value from hardware, software, existing images, etc. and provide the value to the requesting component. For example, noise reduction module 402 may request detectors 408 for a zoom value of lens assembly 208.

In another example, an image application may request detectors 408 to provide the focal distance of lens assembly 208, depth of field, and/or a camera aperture size. Detectors 408 may obtain relative lens locations from lens assembly 208 (e.g., via camera interface 406), and based on the locations and lens parameters, determine the focal distance, the depth of field, and the aperture size. The image application may then use the values returned from detectors 408.

Operating system 410 may include software instructions for managing hardware and software resources of camera 110. For example, operating system 410 may include Linux, Windows, OS X, Android, an embedded operating system, etc. Operating system 410 may also provide certain network services (e.g., Transmission Control Protocol (TCP)/Internet Protocol (IP) stack, file transfer protocol (FTP), Secure Socket Layer (SSL)/Transport Layer Security (TLS), etc.), certain basic device drivers, file management system, memory management, multiprocessing capabilities, etc.

Settings database 412 may store images, user preferences, settings, OS configurations, camera configurations, etc. In some embodiments, settings database 412 may store only information that is needed for camera 110 to boot up in a desired state. Other information (e.g., images, videos, audios, etc.) may be stored in a cloud and/or a network, and may be downloaded to camera 110 on demand.

Camera 110 may include additional, fewer, different, or a differently arranged functional components than those illustrated in FIG. 4. For example, camera 110 may include software applications for recording, encoding, editing, and/or transcoding video, as well as audio programs, additional communication programs (e.g., email program), etc. In addition, functions described as being performed by one of the components of camera 110 may be performed by another component.

Figure 6:
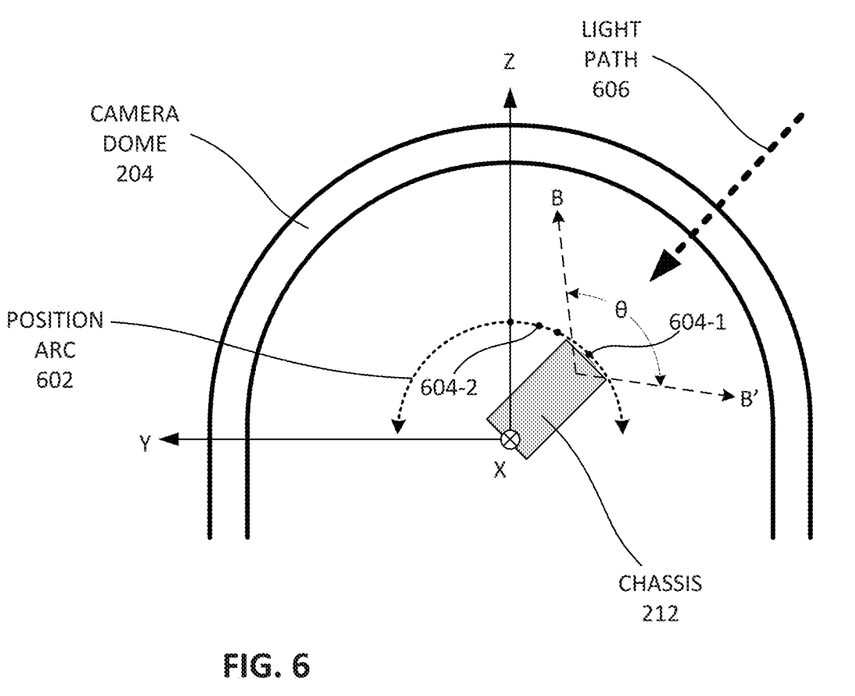
FIG. 6 illustrates camera locations for measuring values for modulation transfer functions for the camera dome of FIGS. 1A, 1B and 2.

FIG. 6 illustrates camera locations for measuring values for a modulation transfer functions of camera dome 204. As shown, camera 110 may rotate about the x-axis to change its viewing angle. As camera 110 rotates about the x-axis, it traces the path of a position arc 602.

In some embodiments, MTF measurement platform 140 may measure a MTF of camera dome 204 for one or more points on the position arc 602, such as a point 604-1 and point 604-2. For each position, light from an external image may pass through a different portion of dome 204 before it enters lens assembly 208 of camera 110.

For each location on the path of position arc 602, MTF measurement platform 140 may configure its MTF measurement equipment/set up to measure and calculate contrast as a function of frequency w. For example, for point 604-1, the detectors for measuring dome MTF would be set up such that the image plane for camera dome 204 is perpendicular to the direction of camera 110 (or tangential to the path of position arc 602 at point 604-1).

If camera dome 204 is rotationally symmetrical about the z-axis and symmetrical about the XZ plane, platform 140 may need to measure MTFs only for a portion of position arc 602 (e.g., a quarter of a circle that camera 110 would trace with 360 degree rotation). A component requesting measurement values from platform 140 may then use the symmetry to infer MTFs for other positions of camera 110 within camera dome 204.

In other implementations, measurement platform 140 may perform measurements for each possible position of camera 110. Such measurements may be taken if camera dome 204 is not symmetrical, misshapen, or for other reasons. In addition, camera 110 may not necessarily trace position arc 602, but another geometrical path, and platform 140 may measure MTFs for points on such a path rather than position arc 602.

Figure 7:
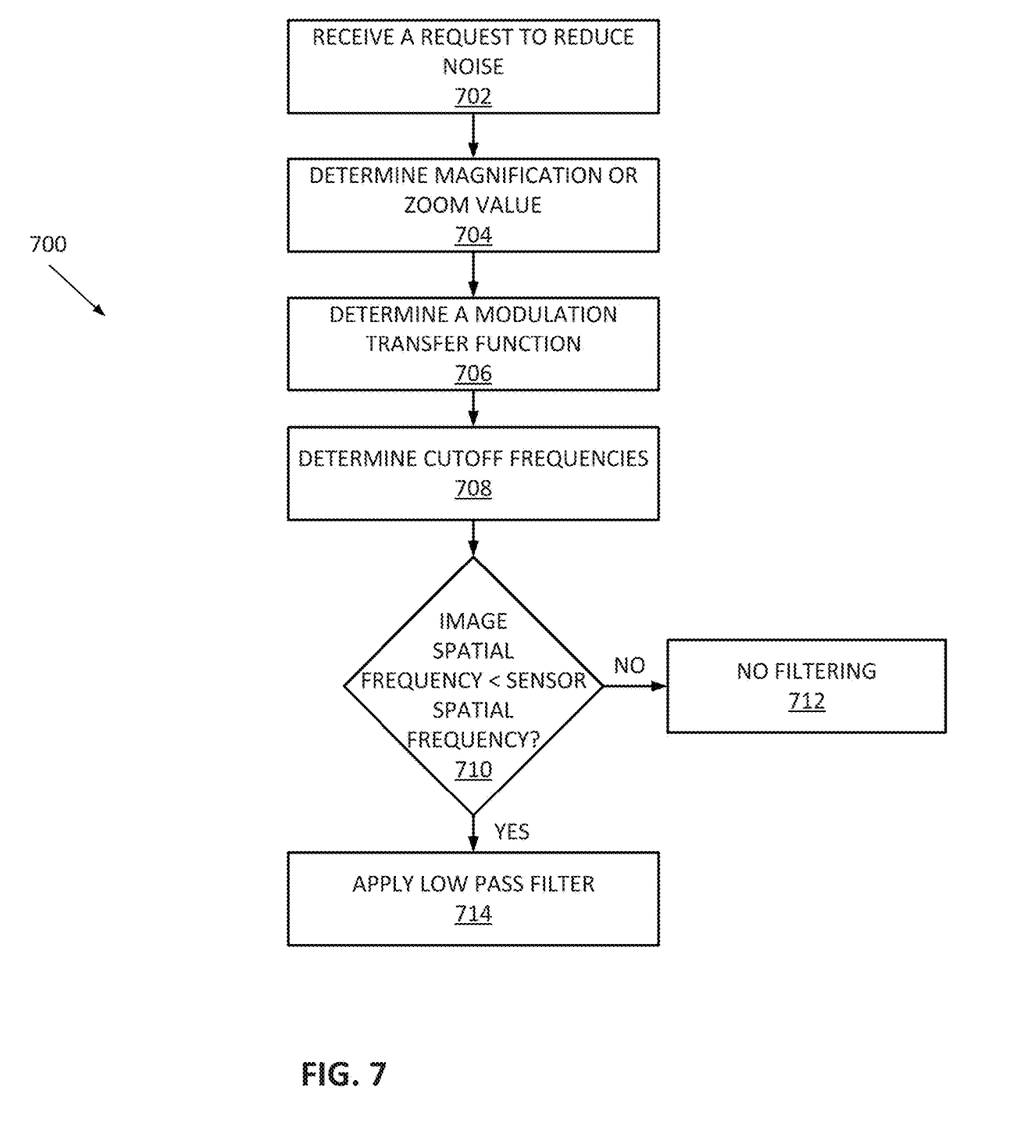
FIG. 7 is a flowchart of an exemplary process for reducing image noise based on a modulation transfer function of the camera dome of FIGS. 1A, 1B and 2.

FIG. 7 is a flowchart of an exemplary process 700 for reducing noise based on zoom and a modulation transfer function. In one embodiment, camera 110 may perform process 700. In other embodiments, management station 130 or another device for performing image processing (e.g., a video transmission device) may perform certain blocks of process 700.

As shown, process 700 may include receiving a request to reduce noise for a captured image (block 702). For example, noise reduction module 402 may receive a request to reduce noise of a captured image from, for example, an image application or an application for transmitting the image.

Process 700 may include, in response to the request, obtaining a magnification or zoom value Z for the captured image (block 704). In one embodiment, the request may provide the zoom value Z. In another embodiment, noise reduction module 402 may query camera interface 406 or detectors 408 to measure the current zoom value Z of lens assembly 208.

Process 700 may include determining an MTF for camera dome 204 (block 706). As discussed above, noise reduction module 402 may retrieve an MTF of dome 204 from MTF database 404. In one embodiment, different MTFs may be stored for each camera position and/or orientation in MTF database 404. If this is the case, noise reduction module 402 may obtain parameters that define camera position and/or orientation from camera interface 406 or detectors 408. In some implementations, noise reduction module 402 may provide parameters for locating the desired MTF, such as camera position and/or orientation, to MTF database 404.

In embodiments where noise reduction module 402 uses MTFs for optical components other than or in addition to that of camera dome 204, noise reduction module 402 may also retrieve additional MTFs for such optical components.

Process 700 may further include determining cutoff frequencies (block 708), including sensor cutoff frequency $f_s$, image cutoff frequency $f_i$, and/or dome cutoff frequency $f_c$. As discussed above, in one embodiment, noise reduction module 402 may determine dome cutoff frequency $f_c$ from the MTF of camera dome 204 and calculate image cutoff frequency $f_i$ based on the dome cutoff frequency $f_c$ and the zoom value Z (e.g., expression (2)). In one embodiment, the image cutoff frequency $f_i$ is determined by dividing the dome cutoff frequency by the zoom value Z, for example. In a different implementation, noise reduction module 402 may determine image cutoff frequency $f_i$ from MTFs of one or more optical components of camera 110 (e.g., lens assembly 208, iris/shutter 206, sensor array 210, etc.) as described above. Sensor cutoff frequency $f_s$ may be determined based on component parameters obtained by camera interface 406, detectors 408, or from settings database 412.

Process 700 may further include determining whether the image cutoff frequency $f_i$ is less than the sensor cutoff frequency $f_s$ ($f_i < f_s$) (block 710). If image cutoff frequency $f_i$ is not less than the sensor cutoff frequency $f_s$ (block 710—no), then process 700 may proceed to block 712 and not apply a low-pass filter (e.g., not apply the additional signal processing described to the captured image). Otherwise if the image cutoff frequency $f_i$ is less than the sensor cutoff frequency $f_s$ (block 710—yes), process 700 may apply a low-pass filter to the captured image. For example, as discussed above, noise reduction module 402 may apply the low-pass filter by taking a Fourier transform of the captured image and multiplying it with a low-pass filter's transfer function in accordance with expression (3). In one embodiment, noise reduction module 402 may retrieve the resulting image by taking an inverse Fourier transform of $Y(\omega)$.

This specification has disclosed various embodiments of a device for reducing noise based on a zoom value Z and a modulation transfer function of a camera dome. By filtering out high frequency noise components of an image based on the modulation transfer function and the zoom, the image may be compressed more than it could be without the filtering. Compressing images in such a manner may lead to bandwidth savings should the images be exchanged over networks.

Although embodiments described herein apply an MTF (or a set of MTFs) to a single image, in other embodiments, camera 110 may be capable of applying different MTFs to different portions of the image. For example, assume that an image is received through different portions of dome 204 (e.g., a spherical portion and a cylindrical portion). Camera 110 may split the image into pieces that correspond to the dome portions and/or different MTFs. For each piece of the image, camera 110 may obtain the cutoff frequency based on the MTFs for different dome portions, and apply a low pass filter with the cut off frequency, in a manner similar to process 700.

It will be apparent that aspects described herein may be implemented in many different forms of software, firmware, and hardware in the implementations illustrated in the figures. The actual software code or specialized control hardware used to implement aspects should not be construed as limiting. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The term "comprises/comprising" when used in this specification is taken to specify the presence of stated features, integers, steps or components but does not preclude the presence or addition of one or more other features, integers, steps, components, or groups thereof.

Further, certain portions of the invention have been described as "logic" that performs one or more functions. This logic may include hardware, such as a processor, an application specific integrated circuit, or a field programmable gate array, software, or a combination of hardware and software.

What is claimed is:

1. A method comprising:
   determining a current zoom value of a camera and a sensor cutoff frequency of a sensor in the camera;
   determining a dome cutoff frequency of a transparent dome of the camera;
   determining an image cutoff frequency using the dome cutoff frequency and the current zoom value; and
   determining whether the image cutoff frequency is less than the sensor cutoff frequency and, when the image cutoff frequency is less than the sensor cutoff frequency, applying a first low-pass filter to an image captured by the camera.

2. The method of claim 1, further comprising:
   determining a portion, of the transparent dome, through which light for a current field of view enters the camera;
   determining a measurement of the light for the portion of the transparent dome and
   determining a first modulation transfer function of the transparent dome based on the measurement made for the portion of the transparent dome.

3. The method of claim 2, wherein determining a measurement includes determining a plurality of measurements of the light when the camera is at a plurality of points on a path, wherein determining the first modulation transfer function includes determining values for the first modulation transfer function when the camera is at locations other than the plurality of points, and wherein determining the values for the first modulation transfer function includes using a geometrical symmetry to infer the values based on the measurements.

4. The method of claim 1, further comprising:
   determining a portion, of the transparent dome, through which light for a current field of view of the camera enters the camera;
   determining a first modulation transfer function of the transparent dome including calculating values for the first modulation transfer function based on a mathematical model of the portion of the transparent dome.

5. The method of claim 1,
   wherein determining the image cutoff frequency includes scaling the dome cutoff frequency using the current zoom value, and
   wherein a cutoff frequency of the first low-pass filter is approximately the same as the image cutoff frequency.

6. The method of claim 2, further comprising:
   determining a second modulation transfer function for a lens assembly of the camera;
   generating a third modulation transfer function by multiplying the first modulation transfer function by the second modulation transfer function over a frequency domain;
   determining an approximate cutoff frequency of the third modulation transfer function; and
   setting a cutoff frequency of the first low-pass filter equal to the approximate cutoff frequency of the third modulation transfer function.

7. The method of claim 1, wherein applying the first low-pass filter to an image captured by the camera includes applying a first low-pass cutoff frequency to a first part of the image and applying a second low-pass cutoff frequency to a second part of the image, wherein the first low-pass cutoff frequency is different than the second low-pass cutoff frequency.

8. A device comprising:
   a memory to store modulation transfer functions;
   a transparent dome through which light passes to a lens assembly;
   the lens assembly for receiving the light and forming an image at a sensor array;
   the sensor array for capturing the image; and
   a processor to:
     capture the image via the sensor array,
     determine a current zoom value of the lens assembly and a sensor cutoff frequency of the sensor array,
     determine a first modulation transfer function, among the modulation transfer functions, of the transparent dome, wherein the first modulation transfer function includes a dome cutoff frequency,
     determine an image cutoff frequency using the dome cutoff frequency and the current zoom value, and
     determine whether the image cutoff frequency is less than the sensor cutoff frequency and, when the image cutoff frequency is less than the sensor cutoff frequency, apply a first low-pass filter to the captured image.

9. The device of claim 8, further comprising a network interface, wherein the processor is further configured to:
   compress the image as part of a video in accordance with a standard; and
   transmit the compressed video through the network interface.

10. The device of claim 9, wherein the standard is a moving picture experts group (MPEG) standard.

11. The device of claim 8, wherein the processor is further to:
   determine a portion, of the transparent dome, through which the light enters the device, wherein the processor determines the first modulation transfer function of the transparent dome based on a measurement made for the portion of the transparent dome.

12. The device of claim 11,
   wherein the processor makes the measurement when the lens assembly is at particular points on a single path,
   wherein when the processor determines the first modulation transfer function, the processor determines values for the first modulation transfer function when the lens assembly is at locations other than the particular points, and
   wherein when the processor determines the values for the first modulation transfer function, the processor uses a geometrical symmetry to infer the values based on the measurement.

13. The device of claim 8, wherein the processor is further to:
   determine a portion, of the transparent dome, through which the light enters the device, wherein when the processor determines the first modulation transfer function of the transparent dome, the processor calculates values for the first modulation transfer function based on a mathematical model of the portion of the transparent dome.

14. The device of claim 13, wherein the modulation transfer function includes a low-pass filter with a dome cutoff frequency, and wherein a cutoff frequency of the first low-pass filter is calculated based on the dome cutoff frequency and the current zoom value.

15. The device of claim 8, wherein the processor is further to:
   determine a second modulation transfer function for the lens assembly;
   generate a third modulation transfer function by multiplying the first modulation transfer function by the second modulation transfer function over a frequency domain;
   determine an approximate cutoff frequency of the third modulation transfer function; and
   set the cutoff frequency of the first low-pass filter equal to the approximate cutoff frequency of the third modulation transfer function.

16. The device of claim 8, wherein the processor is configured to apply the first low-pass filter to an image captured by the camera by applying a first low-pass cutoff frequency to a first part of the image and applying a second low-pass cutoff frequency to a second part of the image, wherein the first low-pass cutoff frequency is different than the second low-pass cutoff frequency.

17. A computer-readable storage medium comprising computer executable instructions that cause, when executed by a processor of a camera, cause the processor to:
   capture an image via a sensor array of the camera,
   determine a current zoom value of a lens assembly of the camera and a sensor cutoff frequency of a sensor in the camera,
   determine a dome cutoff frequency of a transparent dome of the camera,
   determine an image cutoff frequency using the dome cutoff frequency and the current zoom value; and
   determine whether the image cutoff frequency is less than the sensor cutoff frequency and, when the image cutoff frequency is less than the sensor cutoff frequency, apply a first low-pass filter to the captured image.

18. The computer-readable storage medium of claim 17, wherein the instructions, when executed by the processor, further cause the processor to:
   compress the image as part of a video in accordance with a standard; and
   transmit the compressed video through a network interface of the camera.

19. The computer-readable storage medium of claim 17, wherein the instructions, when executed by the processor, further cause the processor to:
   determine a portion, of the transparent dome, through which light enters the camera, wherein the processor determines the first modulation transfer function of the transparent dome based on measurements made for the portion of the transparent dome.

20. The computer-readable storage medium of claim 19, wherein the instructions, when executed by the processor, further cause the processor to:
   make the measurements when the lens assembly is at particular points on a single path,
   when determining the first modulation transfer function, determine values for the first modulation transfer function when the lens assembly is at locations other than the particular points, and
   when determining the values for the first modulation transfer function, use a geometrical symmetry to infer the values based on the measurements.

* * * * *